Aug. 27, 1963  E. EGGER  3,101,736
DIAPHRAGM REGULATING SLIDER
Filed March 3, 1960  3 Sheets-Sheet 1

INVENTOR
Emile Egger
BY
Edward V. Connors
ATTORNEY

Aug. 27, 1963  E. EGGER  3,101,736
DIAPHRAGM REGULATING SLIDER
Filed March 3, 1960  3 Sheets-Sheet 2

INVENTOR
Emile Egger
BY
ATTORNEY

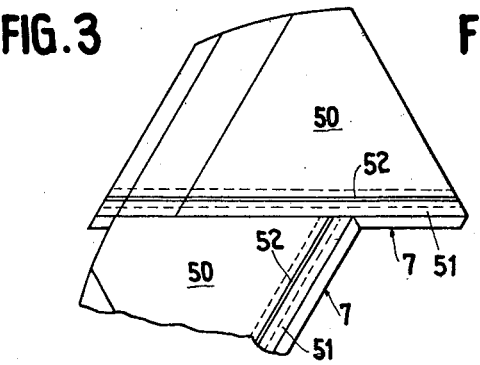
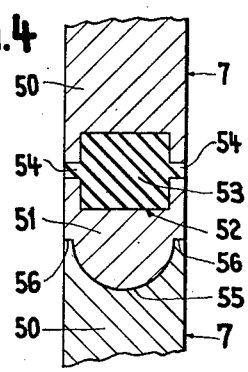
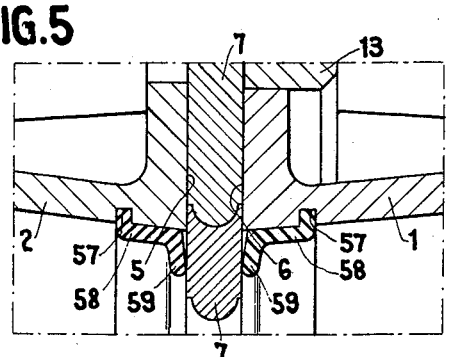
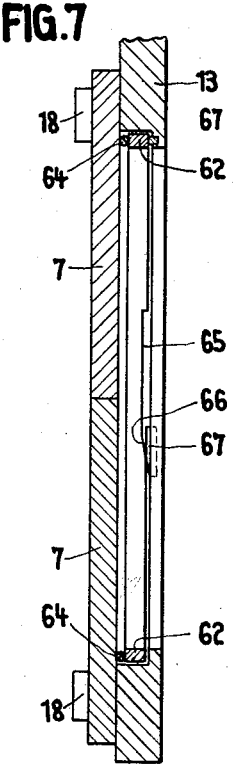
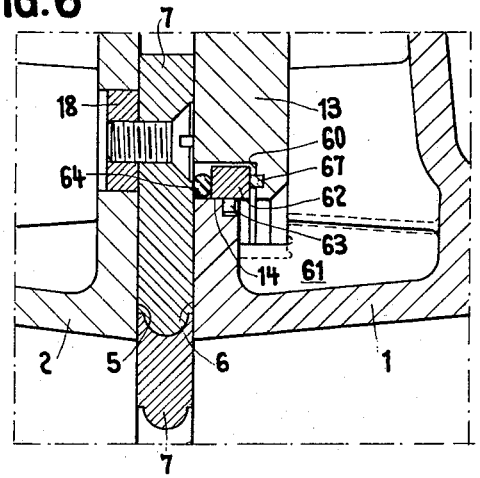

United States Patent Office 3,101,736
Patented Aug. 27, 1963

3,101,736
DIAPHRAGM REGULATING SLIDER
Emile Egger, Cressier, Switzerland, assignor to Emile Egger & Co. A.G., Cressier, Switzerland
Filed Mar. 3, 1960, Ser. No. 12,595
Claims priority, application Switzerland Mar. 12, 1959
14 Claims. (Cl. 137—242)

The present invention concerns a diaphragm regulating slider for regulating the flow of liquid, granular, gaseous or similar flowing media, of the type having a flow canal and diaphragm elements displaceable through openings of the wall of the said flow canal into the flow canal in a direction substantially perpendicular to the axis of the flow canal, such diaphragm elements defining a flow and regulating opening of adjustable size but similar shape without narrow, slit-shaped areas, this regulating opening being substantially coaxial to the said axis of the flow canal.

With various media there is the problem of protecting the members of the regulating device which slide relatively to one another and the diaphragm elements against gradual contamination, which finally may reach an extent causing the regulating ability to be restricted or rendering any regulating movement completely impossible. Since the diaphragm elements of diaphragm slides have to execute quite definite movements, especially when they are disposed in a common plane and contact one another only with their edges, it is necessary to provide at least one accurate guide for each diaphragm element and also at least one driving member for each diaphragm element. There are thus very many points where jamming may occur, due to ingress of foreign matter, if countermeasures have not been adopted.

In known sliding diaphragms only insufficient measures have been adopted except where cumbersome constructions have been used. Particularly no care has been taken for preventing gradual contamination of the driving and guiding mechanism of the diaphragm elements, which driving and guiding mechanisms are located outside the flow canal.

In the diaphragm slider according to the present invention the said difficulties are successfully countered by means preventing hindering of the regulating motion of the said diaphragm elements and of driving means thereof by jamming of impurities between the said diaphragm elements and parts of the said driving means respectively, the said jamming of impurities being prevented as well inside as outside the said flow canal. Preferably all the guide and sliding surfaces subjected to contamination are adapted to be self-cleaning. The diaphragm elements, the guide cams and guide tracks thereof and the engaging members for the diaphragm elements are preferably adapted to slide over one another and are so constructed that they are caused to clean one another.

The foregoing and other more special features of the invention are evident from the following specification and the accompanying drawings, in which FIG. 1 is a vertical section of the diaphragm slider of this invention.

FIGS. 3 and 4 show particular means for tightly pressing contacting edges of the diaphragm elements against each other.

FIGS. 5–7 show modifications of sealing means for the side surfaces of the diaphragm elements shown in FIG. 1.

Figure 1:
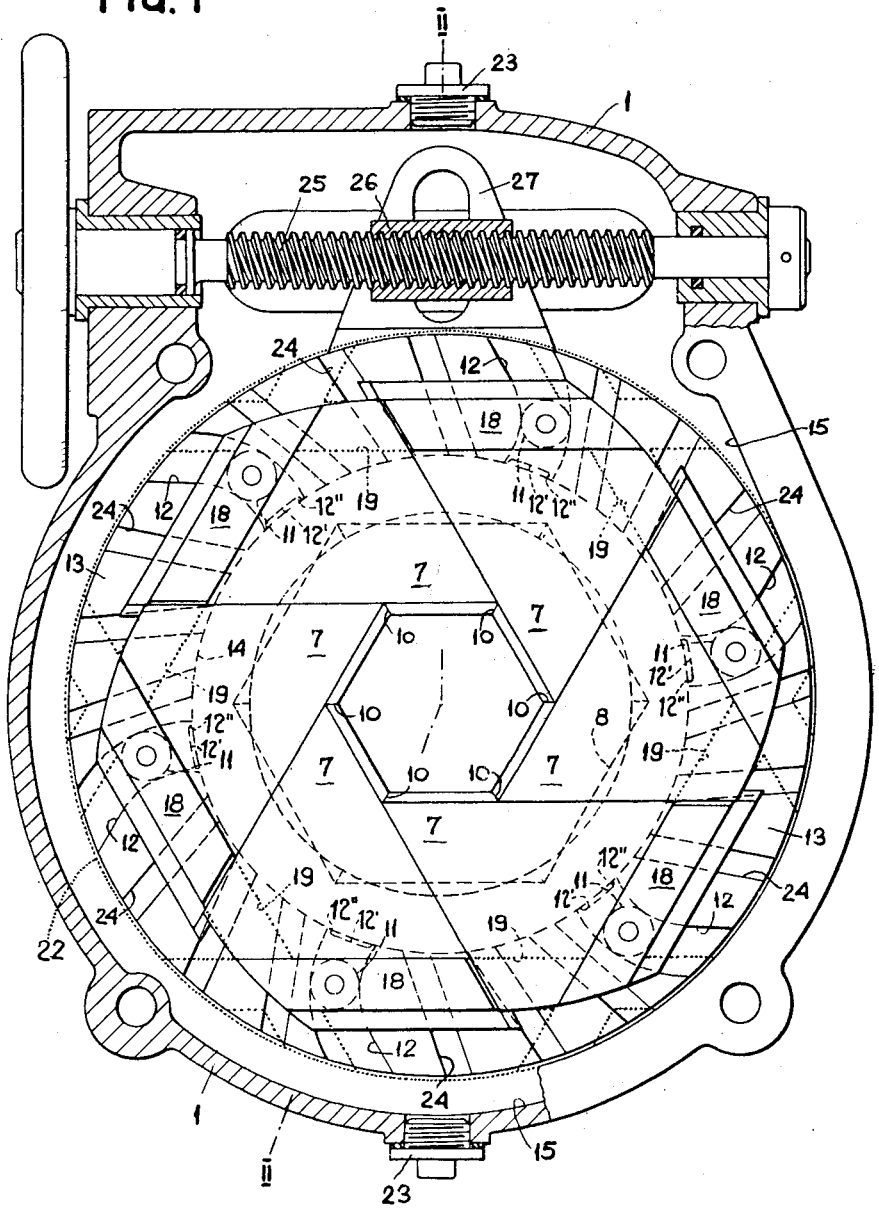

The regulating slider is enclosed by means of a housing 1 having a cover 2 and may be connected by means of a flanged pipe 3 and 4 into a pipe line the flow area of which is to be regulated. The cover 2 and housing 1 in the assembled state each have a flat sealing surface 5 and 6 respectively, between which surfaces, substantially triangular shaped diaphragm elements 7 which are in contact with one another only along the edges, project into a hexagonal regulating aperture 8 (FIG. 1) formed within the sealing surfaces. The hexagonal regulating aperture 8 extends on either side into a circular aperture adjoining one of the flanged pipes 3 or 4. The sealing surfaces 5 and 6 are provided with two circular collecting grooves 9.

The diaphragm elements 7 at both edges enclosing an angle of 60°, which are in contact with adjacent elements, are each provided with a correspondingly convex or concave edge surface. These surfaces engage one in the other and thus provide a perfect hold of the diaphragm elements 7 relative to one another and a good sealing effect of the joints between adjacent elements. The front corners of the elements 7 have sharp edges 10 which, when the elements are displaced relative to one another, slide over the edge surface of the adjacent element and clean them. By this construction the elements are not only prevented from beginning to jam due to impurities arriving therebetween, especially fibrous substances, but also from becoming lifted apart and no longer providing a tight seal.

Outside the sealing surfaces 5 and 6 each diaphragm element 7 is provided on one side with a driving roller 11. Each roller 11 engages a curved track formed by a groove 12 in a regulating ring 13 which is rotatably mounted on a shoulder 14 of the housing 1. Each groove 12 has a constant width from the inner to the outer surface of the regulating ring 13; the outer groove ends lead into an annular space 15 of the housing 1. The bearing shoulder 14 for the regulating ring 13 is of less axial width than the depth of the grooves 12, so that solid or fibrous substances accumulating in the grooves 12 can be ejected, on either side into the space 15, by means of the rollers 11 running therein and therefore the grooves 12 are constantly and automatically kept clean and obstruction of the regulating movements is prevented.

To facilitate ejection towards the interior the inner ends of the grooves 12 have flat transverse grooves 12' milled therein, the sharp outer edges 12" of which also act as scrapers for cleaning the bearing shoulder 14. If, on the other hand, the engaging grooves 12 were not open right through as is often the case in known sliders, then the solid substances collecting in each groove, due to the reciprocating movement of the rollers 11 relative to one another, would be slowly pushed along the groove 12 towards its end where it would finally be compressed to a solid plug and obstruct the regulating movement. In this case there was often no other way out but to dismantle the sliders and thoroughly clean them. It is however also possible for perforations to be provided on the bearing body of the regulating ring which completely expose the inner ends of the grooves 12 whenever the rollers 11 reach their innermost position when the slider is closed.

Substantially rectangular guide blocks 18 displaceably mounted in straight grooves 19 of the housing cover 2 are fixed on the ends of the diaphragm elements 7, opposite to the rollers 11. The grooves 19 completely penetrate the wall 20 and therefore communicate with a ring chamber 21 of the cover 2 and also extend to either side up to an outer limiting surface 22 of the wall 20, as indicated in dotted lines in FIG. 1. These grooves 19 are therefore always cleared out by means of the blocks 18 which pass through them in both directions with little clearance and any solid substances contained therein are ejected without difficulty, either radially outwardly into the ring space 15 or laterally into the ring space 21.

Wedging or jamming of the guide blocks 18 in their grooves 19 is therefore practically impossible.

Finally, the provision of two nipples 23 (FIG. 1) render possible the thorough rinsing out of the communicating hollow spaces of the housing and cover. Such rinsing does not necessitate any interruption of operation despite the fact that the sealing surfaces 5 and 6 are unable to prevent the fluid from gradually seeping into the hollow spaces. The leakage however is so minute that during rinsing no unduly high degree of mixing of the working flow and the rinsing fluid flow need be feared.

The ring grooves 9 are normally not fitted with sealing rings. It has been proved that impurities, especially fibrous material penetrating the sealing surfaces collects in these grooves and finally forms a felt-like packing layer, which effectively limits the penetration of fibrous material to the regulating mechanism. Straight grooves 24, machined in the regulating ring 13 between the driving grooves 12, scrape impurities off the lateral surfaces of the diaphragm elements and discharge them and hence assist the self cleaning of the slider.

The regulation is effected by means of rotating a spindle 25 which, by means of a nut 26 rotates a lever 27 provided on the regulating ring and in turn rotating the ring itself. The displacement of a pointer 28 connected with the nut 26 may be observed through a viewing aperture 29 of the spindle housing and the regulating position may be read on a scale fitted on the outside of the housing. The regulating ring, during rotation, engages rollers 11 which roll in the grooves 12 thereof, whereby the diaphragm elements are displaced along the grooves 19. The edges of the diaphragm elements 7 slide in the manner mentioned over one another, whereby the remaining flow area, which is constantly polygonal in shape, varies in size depending upon the radial position of the elements 7. The diaphragm regulating slider may be constructed so as to have any number of diaphragm elements resulting in a polygonal flow area having a corresponding number of sides.

The ring grooves 9 of the sealing surfaces 5 and 6 not only have the effect mentioned above but also have the additional advantage that their edges scrape off impurities from the lateral surfaces of the diaphragm elements 7 passed above them.

Finally, in order to improve the self-cleaning of the sealing surfaces 5 and 6 it is also possible for the diaphragm elements 7 to be provided with stripping grooves which of course would have to extend in such a manner that the sealing is not unduly impaired.

Sufficient tight sealing of the gaps between adjacent diaphragm elements and between surfaces 5 and 6 and diaphragm elements respectively is a particular problem arising in regulating sliders of the type set out above, because such diaphragm elements have to be assembled and guided between surfaces 5 and 6 in a manner allowing displacement of the elements without excessive frictional resistance. A tight seal is particularly desired when the slider is in its closed position because for this position no flow at all should take place through the slider and in any case the leakage flow has to be reduced to an allowable minimum. On the other hand maximum pressure different is set up across the closed diaphragm of the slider and therefore the danger of a leakage flow of the fluid to be regulated and of fine contamination through the gaps formed between the diaphragm elements and the sealing surfaces 5 and 6 and through the hollow spaces of the slider housing, and consequently formation of deposits of contamination in such hollow spaces and the mechanisms located therein particularly exists when the slider is in its closed position.

FIGURES 3–7 show slider modifications wherein measures have been taken for completely avoiding or substantially reducing the said danger. In FIGS. 3 to 7 corresponding parts of the slider are similarly designated as in FIGS. 1 and 2.

FIGS. 3 and 4 show particular novel means for tightly pressing contacting edges of the diaphragm elements against each other without unduly increasing friction between such edges. Such diaphragm elements are subdivided into a substantially triangular body 50 and a bar 51 contacting the edge of the adjacent element 7, whereby an intermediate profile 52 of an elastically deformable material such as rubber or a synthetic resin is inserted between metallic parts 50 and 51. The profiles of parts 50 to 52 are seen in FIG. 4. The intermediate part 52 has a relatively thick center portion 53 engaging correspondingly formed anchoring slots of parts 50 and 51. Relatively narrow and short webs 54 project from the central portion to the outer surface of the elements. As an example, for a total thickness of 7 mm. of the element 7 part 53 has a length of 5 mm. and a thickness of 5 mm. whereas the webs 54 have a height of 1 mm. each and a thickness in pressure direction, that is transversal to the longitudinal extension of part 52, of 1.5 to 2 mm. When the slider is mounted the intermediate parts 52 are continuously slightly compressed so that the rods 51 are firmly urged against the edges of adjacent elements and a good seal is obtained between the elements.

As shown in FIG. 4, the edge profiles of elements 7 and of parts 50 and 51 respectively may particularly be designed. Such complementary profiles have each a semi-circular portion 55 and end portions 56 substantially perpendicular to the outer surfaces of elements 7 and the plane of such elements respectively. This profile serves a double purpose in that the elements 7 are secured in a common plane by profile portions 55, and a very thin joint or gap is formed along profile parts 56 of contacting elements 7. Such concise, sharp joints have small width and depth and therefore leakage along such joints from the flow canal into the hollow spaces of the housing is practically impossible.

Further sealing measures are shown in FIGS. 5 to 7, such measures being applicable in connection with the measures shown in FIGS. 3 and 4 or independently thereof as actually illustrated in FIGS. 5 and 6.

As shown in FIG. 5, sealing rings 58 are mounted in annular slots 57 of the wall of the flow canal, such sealing rings being made of elastically deformable material and having each an inwardly directed flange 59 tightly contacting one of the side surfaces of diaphragm elements 7. Rings 58 are so shaped when free of stress that their flanges 59 form a smaller angle with the substantially axially extending center portion of such rings, but such flanges are elastically deformed to the shape shown in FIG. 5 when inserted into the slider, whereby the lower ends of flanges 59 are tightly applied against the sides of elements 7. It is evident that under overpressure from one side of the diaphragm, the sealing ring 58 mounted on this side is additionally pressed into the corner formed between the wall of the flow canal and the elements 7 so that a particularly tight seal is obtained when the slider is in its closed position and a substantial pressure difference is set up across the diaphragm, so that leakage of fluid round the outer edges of the elements 7 through the hollow spaces of the housing 1 from the high pressure to the low pressure side of the slider is practically prevented.

Figure 2:
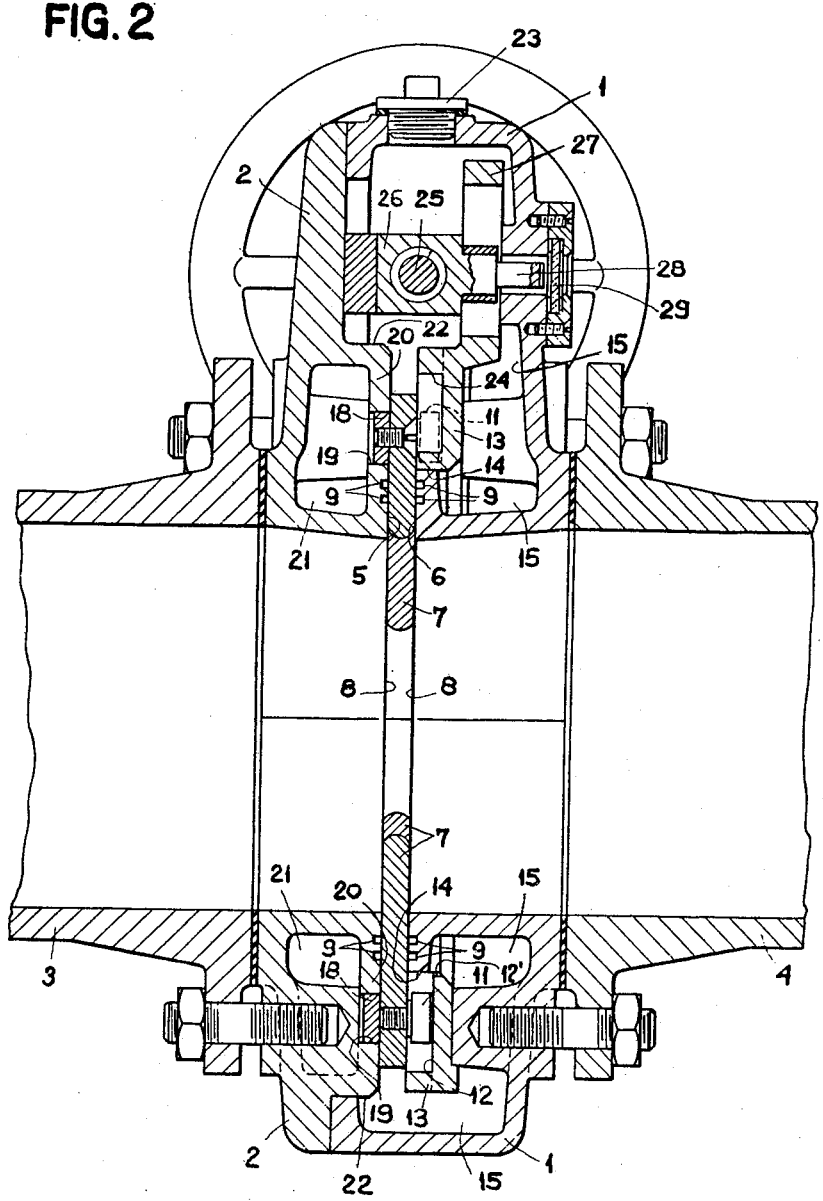
FIG. 2 is a longitudinal section on the line II—II in FIG. 1 through the sliding diaphragm.

A still more reliable seal is obtained with the sealing means shown in FIGS. 6 and 7. The regulating ring 13 having a shape substantially as shown in FIGS. 1 and 2 has a space 60 of substantially rectangular cross section between ring 13 and shoulder 14. Instead of being pivoted on shoulder 14, ring 13 is pivoted on ribs 61 of the housing. A ring 62 is mounted on shoulder 14 in a manner allowing axial displacement thereof, but rotation of the ring is prevented by a cam 63 thereof engaging a recess of the housing 1. A sealing ring 64 of elastically deformable material such as rubber, synthetic resin or the like is inserted between the inner plane face of ring 62 and diaphragm elements 7. On its face opposite the sealing ring 64 the ring 62 has flat recesses 65 (FIG. 7), one end of such recesses being a wedge shaped control surface 66. Three flat recesses 65 are uniformly distributed along the ring circumference, but any other number of such recesses may be provided. The regulating ring 13 has control cams 67 freely engaging recesses 65 at a small distance from the ground thereof when the slider is in open or partially closed position, but engaging wedge surfaces 66 when the regulating ring 13 is rotated to its position corresponding to fully closed position of the slider.

Therefore, when the slider is completely closed, cams 67 will engage wedge surfaces 66 shortly before the slider is completely shut off, whereby the ring 62 is displaced to the left in FIGS. 6 and 7 so that the sealing ring 64 is firmly clamped between ring 62 and elements 7. Preferably provision is made for so deforming sealing ring 64 under the pressure of ring 62 that the sealing ring is also pressed against shoulder 14, whereby any flow round the outer edges of elements 7 is prevented. In this way it is not only prevented that any leakage flow round the elements 7 occurs, but any deposit of contaminations in the hollow spaces of the slider housing and of the mechanisms mounted therein is also prevented at least during shut-down periods of the slider. When the slider is subsequently opened again, cams 67 will leave wedge surfaces 66 so that displacement of ring 62 to the right is allowed and sealing ring 64 is no longer pressed against elements 7. Therefore, displacement of elements 7 is not opposed by the sealing ring 64 and the latter is not appreciably worn due to friction of the diaphragm elements 7 during normal regulation of the slider. Further, very tight sealing is not as vital when the slider is in a partially or fully open regulating position as it is when it is in its closed position because the pressure difference across the diaphragm will be much smaller when the slider is partially open as when it is shut off.

What I claim is:

1. A diaphragm regulating slider for regulating the flow of liquid, granular, gaseous or similar flowing media, of the type having casing means including wall means forming a flow canal and diaphragm elements displaceable through said wall means into the flow canal in a direction substantially perpendicular to the axis of the flow canal, such diaphragm elements disposed in a common plane and contacting one another only at the edges and adapted for relative sliding motion along one another at the edges, edge portions of such diaphragm elements extending into said flow canal defining a flow and regulating opening of adjustable size free of narrow slit-shaped areas, guiding and driving means for said diaphragm elements in said casing means outside said wall means forming the flow canal, projecting and recessed means in interengaging relationship at relatively displaceable portions of said diaphragm elements and guiding and driving means respectively, free spaces formed in said casing means, each of such recessed means having a uniform profile throughout its longitudinal extension and having opposite ends opening into said free spaces of said casing means and into said flow canal respectively, contaminations collecting in such recessed means being thereby removed from such recessed means into said free spaces and flow canal respectively without hindering relative displacement of said diaphragm elements and said guiding and driving means respectively.

2. A slider according to claim 1, wherein, for rinsing through purposes, closable apertures are provided, in at least two places of the casing means.

3. A slider according to claim 1, wherein said casing means form two parallel and radial sealing surfaces, said diaphragm elements being displaceably disposed between said sealing surfaces and the said casing means form a system of annular hollow spaces situated outside these sealing surfaces.

4. A slider according to claim 3, wherein the said means forming the sealing surfaces are provided with collecting grooves for retaining solids emerging along these sealing surfaces, and the edges of said collecting grooves scraping impurities off the lateral surfaces of the diaphragm elements moved thereover.

5. A slider according to claim 1, wherein said diaphragm elements extend between two sealing rings mounted on said wall means forming the flow canal, such sealing rings having each a flange portion elastically applying against the side surfaces of the diaphragm elements.

6. A slider according to claim 1, comprising a sealing ring disposed at the side of the diaphragm elements, a pressure ring adapted to press the said sealing ring against the sides of the diaphragm elements, and means for urging the said pressure ring against the said sealing ring and the latter against the said diaphragm elements when the slider is in its closed position.

7. A slider according to claim 6, the said pressure ring having wedge faces operatively associated with cams of the regulating ring, the said cams engaging the said wedge surfaces when the regulating slider is moved towards its closed position.

8. A diaphragm regulating slider for regulating the flow of liquid, granular, gaseous or similar flowing media, of the type having casing means including wall means forming a flow canal and diaphragm elements displaceable through the wall means forming the said flow canal into the flow canal in a direction substantially perpendicular to the axis of the flow canal, such diaphragm elements disposed in a common plane and contacting one another only at the edges and adapted for relative sliding motion along one another at the edges, edge portions of such diaphragm elements extending into said flow canal defining a flow and regulating opening of adjustable size free of narrow slit-shaped areas, guiding and driving means for said diaphragm elements in said casing means outside said wall means of the flow canal, the said diaphragm elements having contacting edge surfaces whereof the one has a convexly shaped profile engaging a concavely shaped profile of the edge surface of the adjacent diaphragm element, such convexly and concavely shaped contacting edge surfaces having a uniform profile throughout the full length thereof so that the edge surfaces of the diaphragm elements are in uniform engagement throughout the length and width of contacting edge portions independently of the relative position of such diaphragm elements, an inner corner of each diaphragm element contacting the full width of the edge surface of the adjacent diaphragm element for any position of the diaphragm elements thereby acting as a scraper for the full edge surface of the adjacent element for any position of the diaphragm elements.

9. A diaphragm regulating slider for regulating the flow of liquid, granular, gaseous or similar flowing media, of the type having casing means including wall means forming a flow canal and diaphragm elements displaceable through the wall means forming the said flow canal into the flow canal, portions of such diaphragm elements extending into the said flow canal defining a flow and regulating opening, driving means for said diaphragm elements in said casing means outside said wall means forming the flow canal, such driving means including a regulating ring having grooves in which driving members fixed to and projecting from said diaphragm elements engage, free spaces formed in said casing means, said grooves having opposite open ends leading into said free spaces, contaminations collecting in said grooves being ejected through said open ends of said grooves into the said free spaces by means of said driving members adapted for relative displacement along said grooves.

10. A slider according to claim 9, wherein the regulating ring laterally contacts the diaphragm elements and the regulating ring has scraping grooves which laterally clean the diaphragm elements.

11. A diaphragm regulating slider for regulating the flow of liquid, granular, gaseous or similar flowing media, of the type having casing means including wall means forming a flow canal and diaphragm elements displaceable through the wall means into the flow canal, portions of such diaphragm elements extending into the said flow canal defining a flow and regulating opening, driving means for said diaphragm elements in said casing means outside said wall means, a portion in said slider housing having guide grooves, said diaphragm elements having guide members engaging said guide grooves, free spaces formed in said casing means, such guide grooves having opposite ends leading into said free spaces, contaminations collecting in said grooves being ejected through said open ends of the grooves into said free spaces by means of said guide elements adapted for displacement along said grooves.

12. A slider according to claim 11, wherein at least portions of the said guide grooves are slots completely penetrating a wall portion in said casing means.

13. A diaphragm regulating slider for regulating the flow of liquid, granular, gaseous or similar flowing media, having casing means including wall means forming a flow canal and diaphragm elements displaceable through the wall means forming the said flow canal into the flow canal in a direction substantially perpendicular to the axis of the flow canal, such diaphragm elements disposed in a common plane and contacting one another only at the edges and adapted for relative sliding motion along one another at the edges, edge portions of such diaphragm elements extending into said flow canal defining a flow and regulating opening of adjustable size free of narrow slit-shaped areas, guiding and driving means for said diaphragm elements in said casing means outside said wall means, each of the said diaphragm elements being subdivided into a body portion and a bar portion contacting an edge portion of an adjacent diaphragm element, an intermediate part of elastically deformable material tightly inserted between said body portion and bar portion, this intermediate portion being elastically compressed in the assembled condition of the diaphragm elements in the regulating slider whereby the said bar is tightly urged against the said edge portion of the adjacent diaphragm element.

14. A diaphragm regulating slider for regulating the flow of liquid, granular, gaseous or similar flowing media, having casing means including wall means forming a flow canal and diaphragm elements displaceable through the wall means forming the said flow canal into the flow canal in a direction substantially perpendicular to the axis of the flow canal, such diaphragm elements disposed in a common plane and contacting one another only at the edges and adapted for relative sliding motion along one another at the edges, edge portions of such diaphragm elements extending into said flow canal defining a flow and regulating opening of adjustable size free of narrow slit-shaped areas, guiding and driving means for said diaphragm elements in said casing means outside said wall means, contacting edge portions of adjacent diaphragm elements interengaging with complementary profiled edge portions comprising a curved center portion and plane rim portions, such rim portions being in a plane substantially perpendicular to said common plane comprising the diaphragm elements.

References Cited in the file of this patent
UNITED STATES PATENTS

| | | |
|---|---|---|
| 2,045,113 | Ward | June 23, 1936 |
| 2,652,222 | McCowan | Sept. 15, 1953 |
| 2,662,545 | Kelley | Dec. 15, 1953 |
| 2,819,864 | Marks | Jan. 14, 1958 |
| 2,991,794 | Harrower | July 11, 1961 |

FOREIGN PATENTS

| | | |
|---|---|---|
| 579,471 | Great Britain | Aug. 6, 1946 |